US012598620B2

(12) United States Patent
Matsumura et al.

(10) Patent No.: US 12,598,620 B2
(45) Date of Patent: Apr. 7, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 391 days.

(21) Appl. No.: 17/998,421

(22) PCT Filed: May 14, 2020

(86) PCT No.: PCT/JP2020/019306
§ 371 (c)(1),
(2) Date: Nov. 10, 2022

(87) PCT Pub. No.: WO2021/229760
PCT Pub. Date: Nov. 18, 2021

(65) Prior Publication Data
US 2023/0209569 A1      Jun. 29, 2023

(51) Int. Cl.
*H04W 72/23* (2023.01)
*H04L 5/00* (2006.01)
*H04W 72/232* (2023.01)

(52) U.S. Cl.
CPC ......... *H04W 72/232* (2023.01); *H04L 5/0051* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 10,952,231 B2 * | 3/2021 | Liou | ........... | H04W 72/23 |
| 2020/0288479 A1 * | 9/2020 | Xi | ........... | H04W 76/27 |
| 2021/0099223 A1 * | 4/2021 | Zhang | ........... | H04B 7/0877 |
| 2021/0219336 A1 * | 7/2021 | Fan | ........... | H04L 5/0094 |
| 2021/0320699 A1 * | 10/2021 | Zhou | ........... | H04L 5/0048 |
| 2022/0408470 A1 * | 12/2022 | Jung | ........... | H04B 7/06968 |
| 2023/0052764 A1 * | 2/2023 | Zhang | ........... | H04L 1/0026 |

(Continued)

OTHER PUBLICATIONS

International Search Report issued in International Application No. PCT/JP2020/019306, mailed on Dec. 15, 2020 (5 pages).

(Continued)

*Primary Examiner* — Kodzovi Acolatse

(74) *Attorney, Agent, or Firm* — Osha Bergman Watanabe & Burton LLP

(57) ABSTRACT

A terminal according to an aspect of the present disclosure includes: a receiving section that, when there is no downlink signal having an indicated TCI state in a same symbol as the A-CSI-RS, receives an aperiodic channel state information-reference signal (A-CSI-RS) using two default transmission configuration indication (TCI) states for a physical downlink shared channel; and a control section that uses, based on at least one of capability information and a physical downlink control channel for triggering of the A-CSI-RS, one default TCI state of the two default TCI states for measurement of the A-CSI-RS. According to the aspect of the present disclosure, the A-CSI-RS can be appropriately measured.

4 Claims, 6 Drawing Sheets

(56)     References Cited

U.S. PATENT DOCUMENTS

| 2023/0155783 | A1* | 5/2023 | Liu | H04B 7/0695 |
| | | | | 370/329 |
| 2023/0164780 | A1* | 5/2023 | Liu | H04L 5/0023 |
| | | | | 370/329 |
| 2023/0179354 | A1* | 6/2023 | Muruganathan | H04L 5/0091 |
| | | | | 370/329 |

OTHER PUBLICATIONS

Written Opinion issued in International Application No. PCT/JP2020/019306, mailed on Dec. 15, 2020 (3 pages).

Moderator (OPPO); "Summary of email thread [100b-e-NR-eMIMO-multiTRP-03]"; 3GPP TSG RAN WG1 #100bis, R1-2002949, e-meeting, Apr. 20-30, 2020 (17 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). In addition, the specifications of LTE-Advanced (3GPP Rel. 10 to 14) have been drafted for the purpose of further increasing capacity and advancement of LTE (third generation partnership project (3GPP) Release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future radio communication system (for example, NR), it has been studied that a user terminal (terminal, a user terminal, user equipment (UE)) controls transmission/reception processing on the basis of information regarding quasi-co-location (QCL). It has been studied that a plurality of transmission points transmit downlink (DL) signals.

However, it is not clear how to measure an aperiodic channel state information reference signal (A-CSI-RS) when receiving DL signals from the plurality of transmission points. If the DL precoder is not properly measured, system performance is likely to be deteriorated, for example, throughput is likely to be deteriorated.

Therefore, an object of the present disclosure is to provide a terminal, a radio communication method, and a base station that appropriately measure an A-CSI-RS.

Solution to Problem

A terminal according to an aspect of the present disclosure includes: a receiving section that, when there is no downlink signal having an indicated TCI state in a same symbol as the A-CSI-RS, receives an aperiodic channel state information-reference signal (A-CSI-RS) using two default transmission configuration indication (TCI) states for a physical downlink shared channel; and a control section that uses, based on at least one of capability information and a physical downlink control channel for triggering of the A-CSI-RS, one default TCI state of the two default TCI states for measurement of the A-CSI-RS.

Advantageous Effects of Invention

According to the aspect of the present disclosure, the A-CSI-RS can be appropriately measured.

Figure 1:
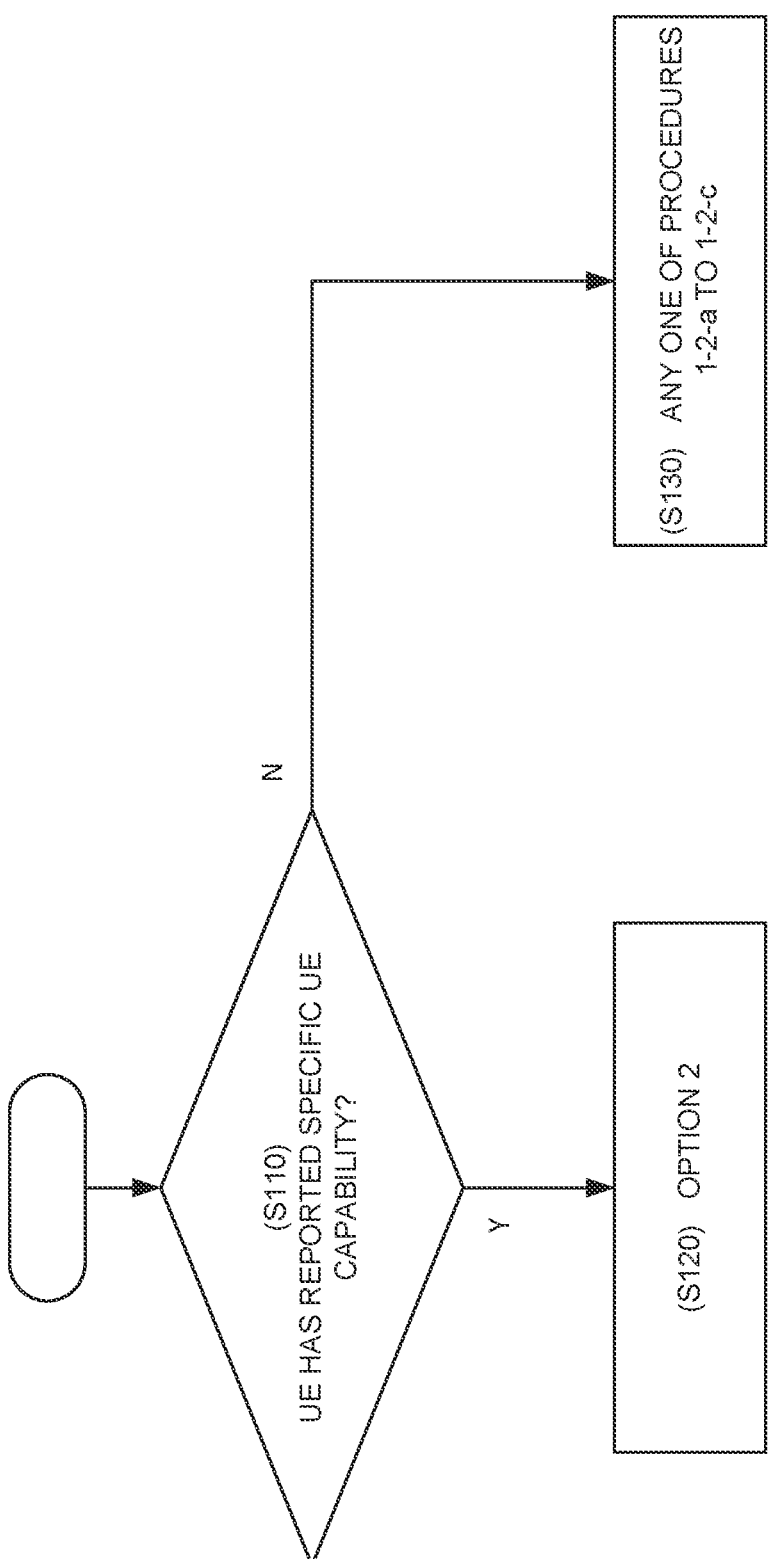
FIG. 1 is a diagram illustrating an example of a UE operation according to a first embodiment.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) based on a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information, or the like. The TCI state may be configured in the UE for each channel or each signal.

The QCL is an indicator indicating a statistical property of a signal/channel. For example, when one signal/channel and another signal/channel have a QCL relation may mean that it is possible to assume that at least one of Doppler shift, Doppler spread, an average delay, a delay spread, and a spatial parameter (for example, a spatial Rx parameter) is identical (in QCL with respect to at least one of these) between the plurality of different signals/channels.

Note that the spatial Rx parameter may correspond to a reception beam of the UE (for example, a reception analog beam), and the beam may be specified based on spatial QCL. The QCL (or at least one element of the QCL) in the present disclosure may be replaced with spatial QCL (sQCL).

A plurality of types of QCL (QCL types) may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be referred to as a QCL assumption for the UE to assume that a certain control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel based on a TCI state of the signal/channel or the QCL assumption.

The TCI state may be, for example, information regarding the QCL of a target channel (in other words, a reference signal (RS) for the channel) and another signal (for example, another RS). The TCI state may be configured (given in instruction) by higher layer signaling, physical layer signaling, or a combination thereof.

The physical layer signaling may be, for example, Downlink Control Information (DCI).

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An RS of QCL type X in a TCI state may mean an RS in a QCL type X relation with (DMRS of) a certain channel/signal, and this RS may be referred to as a QCL source of QCL type X in the TCI state.

(Path-Loss RS)

The Path-loss $PL_{b,f,c}$ ($q_d$) [dB] in transmission power control of each of a PUSCH, a PUCCH, and an SRS is calculated by the UE by using the index $q_d$ of a reference signal (an RS, or a Path-loss reference RS (PathlossReferenceRS)) for a downlink BWP associated with the active UL BWP b of the carrier f of the serving cell c. In the present disclosure, the Path-loss reference RS, the Path-loss (PL)-RS, the index $q_d$, the RS used for Path-loss calculation, and an RS resource used for Path-loss calculation may be replaced with each other. In the present disclosure, calculation, estimation, measurement, and tracking may be replaced with each other.

Studies are being made on whether to change the existing mechanism of higher layer filtered RSRP for Path-loss measurement when the Path-loss RS is updated by an MAC CE.

When the Path-loss RS is updated by an MAC CE, Path-loss measurement based on L1-RSRP may be applied. At available timing after the MAC CE for updating the Path-loss RS, higher layer filtered RSRP may be used for Path-loss measurement; before the higher layer filtered RSRP is applied, L1-RSRP may be used for Path-loss measurement. At available timing after the MAC CE for updating the Path-loss RS, higher layer filtered RSRP may be used for Path-loss measurement; before the above-mentioned timing, the higher layer filtered RSRP of the previous Path-loss RS may be used. Similar to the operation of Rel. 15, higher layer filtered RSRP may be used for Path-loss measurement, and the UE may track all Path-loss RS candidates configured by the RRC. The maximum number of Path-loss RSs that can be configured by the RRC may depend on the UE capability. When the maximum number of Path-loss RSs that can be configured by the RRC is X, X or less Path-loss RS candidates may be configured by the RRC, and a Path-loss RS may be selected by the MAC CE from among the configured Path-loss RS candidates. The maximum number of Path-loss RSs that can be configured by RRC may be 4, 8, 16, 64, or the like.

In the present disclosure, higher layer filtered RSRP, filtered RSRP, and layer 3 filtered RSRP may be replaced with each other.

(Default TCI State/Default Spatial Relation/Default PL-RS)

In an RRC connection mode, both in a case in which in-DCI TCI information (higher layer parameter TCI-PresentInDCI) is set to "enabled" and in a case in which no in-DCI TCI information is configured, if the time offset between the reception of DL DCI (DCI that schedules a PDSCH) and the corresponding PDSCH (the PDSCH scheduled by the DCI) is smaller than a threshold (time Duration For QCL) (application condition: a first condition), in the case of non-cross-carrier scheduling, the TCI state (a default TCI state) of the PDSCH may be the TCI state of the lowest CORESET ID in the newest slot in an active DL BWP of the CC (of a specific UL signal). Otherwise, the TCI state (a default TCI state) of a PDSCH may be the TCI state of the lowest TCI state ID of PDSCHs in an active DL BWP of a CC where scheduling is made.

In Rel. 15, individual MAC CEs of an MAC CE for activation/deactivation of a PUCCH spatial relation and an MAC CE for activation/deactivation of an SRS spatial relation are needed. The PUSCH spatial relation conforms to the SRS spatial relation.

In Rel. 16, at least one of an MAC CE for activation/deactivation of a PUCCH spatial relation and an MAC CE for activation/deactivation of an SRS spatial relation may not be used.

When, in FR2, neither a spatial relation nor a PL-RS for a PUCCH is configured (application condition: a second condition), default assumptions of the spatial relation and the PL-RS (a default spatial relation and a default PL-RS) are applied to the PUCCH. When, in FR2, neither a spatial relation nor a PL-RS for an SRS (an SRS resource for an SRS, or an SRS resource corresponding to an SRI in DCI format 0_1 that schedules a PUSCH) is configured (application condition: the second condition), default assumptions of the spatial relation and the PL-RS (a default spatial relation and a default PL-RS) are applied to the PUSCH scheduled by DCI format 0_1 and the SRS.

When CORESETs are configured in an active DL BWP on the CC, the default spatial relation and the default PL-RS may be the TCI state or the QCL assumption of the CORESET having the lowest CORESET ID in the active DL BWP. When no CORESETs are configured in an active DL BWP on the CC, the default spatial relation and the default PL-RS may be the active TCI state having the lowest ID of PDSCHs in the active DL BWP.

In Rel. 15, the spatial relation of a PUSCH scheduled by DCI format 0_0 conforms to the spatial relation of the PUCCH resource having the lowest PUCCH resource ID among active spatial relations of PUCCHs on the same CC.

Even when no PUCCHs are transmitted on SCells, the network needs to update the PUCCH spatial relations on all SCells.

In Rel. 16, a PUCCH configuration for a PUSCH scheduled by DCI format 0_0 is not needed. When, for a PUSCH scheduled by DCI format 0_0, there is no active PUCCH spatial relation or no PUCCH resource on an active UL BWP in the CC (application condition: the second condition), a default spatial relation and a default PL-RS are applied to the PUSCH.

The above-mentioned threshold may be referred to as QCL time duration "time Duration For QCL", "threshold", "threshold for offset between a DCI indicating a TCI state and PDSCH scheduled by the DCI", "threshold-Sched-Offset", a schedule offset threshold, a scheduling offset threshold, or the like.

(DL Reception Beam Management)

The UE may be configured with one or more TCI states on the serving cell. The UE completes switching of an active TCI state within a delay time. When the active TCI state is updated by the MAC CE, a point of time from which the updated TCI state (target TCI state) is applied (a length of the delay time) depends on whether or not the target TCI state is known (measured). When the target TCI is known (measured), the UE may apply the target TCI state after a time at which the target TCI becomes known.

When the following known conditions for TCI state (conditions for TCI state to be considered known) are satisfied, the target TCI state is known.

During a period (TCI switching period) from the last transmission of the RS resource used for the L1-RSRP measurement report for the target TCI state to the completion of the active TCI state switching, the RS resource for the L1-RSRP measurement is an RS in the target TCI state or an RS having a QCL relation with the target TCI state.

During the TCI switching period, a TCI state switching command is received within 1280 ms from the last transmission of that RS resource for beam reporting or measurement.

During the TCI switching period, before the TCI state switching command, the UE transmits at least one L1-RSRP report for the target TCI state.

During the TCI switching period, the target TCI state is in a detectable state.

During the TCI switching period, the SSB associated with the target TCI state is in a detectable state.

During the TCI switching period, a signal-to-noise ratio (SNR) of the target TCI state is −3 dB or more.

When the known conditions for TCI state are not satisfied, the target TCI state is unknown.

When the target TCI state is known, the UE can receive the PDCCH with the target TCI state of the serving cell where TCI state switching occurs before slot $n+T_{HARQ}+(3 \text{ ms}+TO_k*(T_{first-SSB}+T_{SSB-proc})$/NR slot length, in response to reception of the PDSCH carrying the MAC CE activation command in the slot n. The UE can receive the PDCCH with the old (pre-updating) TCI state up to slot $n+T_{HARQ}$ (3 ms+$TO_k*(T_{first-SSB})$/NR slot length.

Here, $T_{HARQ}$ is a time between DL data transmission and acknowledgement. $T_{first-SSB}$ is a time required until the MAC CE command is decoded by the UE and then the first SSC transmission is performed. $T_{SSB-proc}$ is 2 ms. $TO_k$ is 1 when the target TCI state is not in the active TCI state list for the PDSCH and 0 otherwise.

When the target TCI state is unknown, in response to reception of the PDSCH carrying the MAC CE activation command in the slot n, the UE can receive the PDCCH with the target TCI state of the serving cell where TCI state switching occurs before slot $n+T_{HARQ}+(3 \text{ ms}+T_{L1-RSRP}+TO_{uk}*(T_{first-SSB}+T_{SSB-proc})$)/NR slot length. The UE can receive the PDCCH with the old (pre-updating) TCI state up to slot n $T_{HARQ}+(3 \text{ ms}+T_{L1-RSRP}+TO_{uk}*(T_{first-SSB})$)/NR slot length.

Here, $T_{L1-RSRP}$ is a time for L1-RSRP measurement for improving the reception beam. $T_{L1-RSRP}$ for the SSB is an L1-RSRP measurement period $T_{L1-RSRP\_Measurement\_Period\_SSB}$ based on an SSB in the case of M=1 and $T_{Report}$=0. $T_{L1-RSRP}$ for the CSI-RS is an L1-RSRP measurement period $T_{L1-RSRP\_Measurement\_Period\_CSI-RS}$ based on a CSI-RS in the case of M=1 and $T_{Report}$=0 for a periodic CSI-RS and an aperiodic CSI-RS in the case in which a resource quantity in the resource set is at least equal to MaxNumberRxBeam. $TO_{uk}$ is 1 for CSI-RS-based L1-RSRP measurements and 0 for SSB-based L1-RSRP measurements when TCI state switching includes QCL type D. In addition, $TO_{uk}$ is 1 when the TCI state switching includes other QCL types. When the TCI state switching includes only QCL type A, QCL type B, or QCL type C, for the SSB in FR2, $T_{L1-RSRP\_Measurement\_Period\_SSB}$=0 is obtained, and $T_{L1-RSRP\_Measurement\_Period\_CSI-RS}$=0 in FR2 is obtained. When the TCI state switching includes QCL type D, $T_{first-SSB}$ is a time required until L1-RSRP measurement is performed and then the first SSB measurement is performed. For other ALC types, $T_{first-SSB}$ is a time required until the MAC CE command is decoded by the UE and then the first SSC transmission is performed. For the target TCI state, the SSB is QCL type A or QCL type C.

The switching timing to the target TCI state in the case in which the target TCI state is unknown may be timing when TL1-RSRP is added to the switching timing to the target TCI state in the case in which the target TCI state is known.

(Multi-TRPs)

In NR, studies are underway to allow one or more transmission/reception points (TRPs) (multi-TRPs (MTRPs)) to perform DL transmission to UE by using one or more panels (multi-panels). Further, studies are underway to allow the UE to perform UL transmission to one or more TRPs by using one or more panels.

Note that the plurality of TRPs may correspond to the same cell identifier (ID), or may correspond to different cell IDs. The cell ID may be a physical cell ID or a virtual cell ID.

The multiple TRPs (for example, TRPs #1 and #2) are connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRP transmission.

In the NCJT, for example, the TRP #1 performs modulation mapping and layer mapping on a first codeword, performs first precoding in a first number of layers (for example, two layers), and transmits a first PDSCH. In addition, the TRP #2 performs modulation mapping and layer mapping on a second codeword, performs second precoding in a second number of layers (for example, two layers), and transmits a second PDSCH.

Note that a plurality of PDSCHs (multi-PDSCHs) subjected to the NCJT may be defined as partially or completely overlapping at least one of a time domain or a frequency domain. That is, the first PDSCH from a first TRP and the second PDSCH of a second TRP may overlap at least one of time resources or frequency resources.

The first PDSCH and the second PDSCH may be assumed not to be in quasi-co-located (QCL) relation (not to be quasi-co-location (QCL)). Reception of the multi-PDSCHs may be replaced with simultaneous reception of PDSCHs that are not of a certain QCL type (for example, QCL type D.

When a plurality of PDSCHs (which may be referred to as multiple PDSCHs (multi-PDSCHs)) from the multi-TRPs may be scheduled by using one piece of DCI (single DCI or single PDCCH) (single master mode). When each of a plurality of PDSCHs from the multi-TRPs may be scheduled by using a plurality of pieces of DCI (multi-DCI or multiple PDSCHs (multi-PDSCHs)) (multi-master mode).

Such a multi-TRPs scenario can perform more flexible transmission control using a high-quality channel.

In RRC configuration information for linking a plurality of pairs of PDSCHs and PDSCHs having a plurality of TRPs, one control resource set (CORESET) in PDCCH configuration information (PDCCH-Config) may correspond to one TRP, to support intra-cell (having the same cell ID) and inter-cell (having different cell IDs) multi-TRP transmission based on the plurality of PDSCHs.
(CSI)

In NR, a UE measures a channel state by using a reference signal (or a resource for the reference signal) and feeds back (reports) channel state information (CSI) to a network (for example, a base station).

The UE may measure the channel state using at least one of a channel state information reference signal (CSI-RS), a synchronization signal/physical broadcast channel (SS/PBCH) block, a synchronization signal (SS), a demodulation reference signal (DMRS), and the like.

A CSI-RS resource may include at least one of a Non Zero Power (NZP) CSI-RS resource, a Zero Power (ZP) CSI-RS resource, and a CSI Interference Measurement (CSI-IM) resource.

A resource for measuring a signal component for CSI may be referred to as a signal measurement resource (SMR) or a channel measurement resource (CMR). The SMR (CMR) may include, for example, an NZP CSI-RS resource for channel measurement, an SSB, and the like.

A resource for measuring an interference component for CSI may be referred to as an Interference Measurement Resource (IMR). The IMR may include, for example, at least one of the NZP CSI-RS resource for interference measurement, an SSB, a ZP CSI-RS resource, and a CSI-IM resource.

The SS/PBCH block is a block including a synchronization signal (e.g., primary synchronization signal (PSS) and secondary synchronization signal (SSS)) and a PBCH (and the corresponding DMRS), which may be called an SS block (SSB) or the like.

Note that, the CSI may include at least one of a Channel Quality Indicator (CQI), a Precoding Matrix Indicator (PMI), a CSI-RS Resource Indicator (CRI), an SS/PBCH Block Resource Indicator (SSBRI), a Layer Indicator (LI), a Rank Indicator (RI), Layer 1 Reference Signal Received Power (L1-RSRP), L1-Reference Signal Received Quality (RSRQ), an L1-Signal to Interference Plus Noise Ratio (SINR), an L1-Signal to Noise Ratio (SNR), and the like.

The CSI may include a plurality of parts. A CSI part 1 may include information with a relatively small number of bits (for example, the RI). A CSI part 2 may include information with a relatively large number of bits (for example, the CQI) such as information determined on the basis of the CSI part 1.

Furthermore, the CSI may also be classified into several CSI types. The type and size of information to be reported may be different depending on the CSI type. For example, a CSI type configured for performing communication using a single beam (also referred to as type 1 (type I) CSI, CSI for a single beam, or the like), and a CSI type configured for performing communication using multiple beams (also referred to as type 2 (type II) CSI, CSI for multiple beams, or the like) may be specified. The usage of the CSI type is not limited to those.

As a CSI feedback method, periodic CSI (periodic CSI (P-CSI)) report, aperiodic CSI (Aperiodic CSI (A-CSI, AP-CSI)) report, semi-persistent CSI (semi-persistent CSI (SP-CSI)) report, and the like have been studied.

The UE may be notified of CSI measurement configuration information using higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), other system information (OSI), or the like.

The physical layer signaling may be, for example, Downlink Control Information (DCI).

The CSI measurement configuration information may be configured using, for example, the RRC information element "CSI-MeasConfig". The CSI measurement configuration information may include CSI resource configuration information (RRC information element "CSI-ResourceConfig"), CSI report configuration information (RRC information element "CSI-ReportConfig"), and the like. The CSI resource configuration information is related to a resource for CSI measurement, and the CSI reporting configuration information is related to how the UE performs CSI reporting.

The RRC information element (or the RRC parameter) concerning the CSI report setting and the CSI resource setting is explained.

The CSI reporting configuration information ("CSI-ReportConfig") includes channel measurement resource information ("resourcesForChannelMeasurement"). Furthermore, the CSI report configuration information may include resource information for interference measurement (for example, NZP CSI-RS resource information for interference measurement ("nzp-CSI-RS-ResourcesForInterference"), CSI-IM resource information for interference measurement ("csi-IM-ResourcesForInterference"), and the like. These pieces of resource information correspond to CSI resource configuration information IDs (Identifiers) ("CSI-ResourceConfigId").

Note that, the CSI resource configuration information IDs (which may be referred to as CSI resource configuration IDs) corresponding to respective pieces of resource information may have the same value in one or more IDs or may respectively have different values.

The CSI resource setting information ("CSI-ResourceConfig") may include a CSI resource setting information ID, CSI-RS resource set list information ("csi-RS-ResourceSetList"), a resource type ("resourceType"), and the like. The CSI-RS resource set list may include at least one of NZP CSI-RS and SSB information ("nzp-CSI-RS-SSB") for measurement and CSI-IM resource set list information ("csi-IM-Resource Set List").

The resource type represents a behavior of a time domain of this resource setting, and "aperiodic", "semi-persistent", and "periodic" can be set. For example, the corresponding CSI-RS may be referred to as A-CSI-RS (AP-CSI-RS), SP-CSI-RS, or P-CSI-RS.

Note that, a resource for channel measurement may be used for calculation of, for example, the CQI, PMI, L1-RSRP, and the like. Furthermore, a resource for interference measurement may be used for calculation of the L1-SINR, L1-SNR, L1-RSRQ, and other indicators regarding interference.

(A-CSI-RS Reporting/A-CSI-RS)

The triggering state is started using a CSI request field in the DCI.

For A-CSI-RS resources in one CSI-RS set associated with CSI triggering states (CSI triggering states), the UE is indicated to perform QCL configuration of a QCL RS source and a QCL type through higher layer signaling of QCL information (qcl-Info) including a list of references to TCI states (TCI-States) for A-CSI-RS resources associated with that CSI triggering state. If one state referenced in the list is set with a reference to one RS associated with "QCL type D", the RS may be an SS/PBCH block located in the same or different CC/DL BWP or a CSI-RS resource located in the same or different CC/DL BWP and set as periodic or semi-persistent.

If the following condition a-1 is satisfied, the UE may follow the following procedures a-1 and a-2.

[Condition a-1]

For a scheduling offset between the last symbol of the PDCCH carrying the triggering DCI (DCI that triggers the A-CSI-RS) and the first symbol of the A-CSI-RS in the non-zero power CSI-RS (NZP-CSI-RS) resource set (NZP-CSI-RS Resource Set) set without involving the TRS information (higher layer parameter trs-Info), if the beam switching timing threshold (beam Switching Timing) reported by the UE is one of {14, 28, 48}, the scheduling offset is smaller than the reported threshold, or if the reported threshold is one of {224,336}, the scheduling offset is smaller than 48.

[Procedure a-1]

If there is any other DL signal having one indicated TCI state in the same symbol as the CSI-RS, the UE also applies the QCL assumption of the DL signal when receiving the A-CSI-RS. The DL signal (other DL signal) refers to a PDSCH having an offset equal to or larger than the time threshold for QCL (time Duration For QCL), an A-CSI-RS scheduled with an offset equal to or larger than the beam switching timing threshold in the case in which the beam switching timing threshold reported by the UE is one of {14, 28, 48}, an A-CSI-RS scheduled with an offset equal to or larger than 48 in the case in which the beam switching timing threshold reported by the UE is one of {224,336}, a periodic CSI-RS (P-CSI-RS), and a semi-persistent CSI-RS (SP-CSI-RS).

[Procedure a-2]

Otherwise, when receiving the A-CSI-RS, the UE applies the QCL assumption used for the CORESET associated with the monitored search space and having the lowest CORESET ID (the lowest control Resource Set Id) in the last slot in which one or more CORESETs are monitored in the active BWP of the serving cell of the UE.

If the following condition b-1 is satisfied, the UE may follow the following procedure b-1.

[Condition b-1]

For a scheduling offset between a last symbol of a PDCCH carrying triggering DCI (DCI that triggers an A-CSI-RS) and a first symbol of the A-CSI-RS, if a beam switching timing threshold (beam Switching Timing) reported by the UE is one of {14, 28, 48}, the scheduling offset is equal to or larger than a reported threshold; or if the reported threshold is one of {224,336}, the scheduling offset is equal to or larger than 48.

[Procedure b-1]

It is expected that the UE applies the QCL assumption in the indicated TCI state to the A-CSI-RS resource in the CSI triggering state indicated by the CSI triggering field (CSI request field) in the DCI.

In a multi-TRP system based on single DCI, it has been studied that, if the scheduling offset of the A-CSI-RS is smaller than a threshold (for example, a beam switch timing threshold, beam switch Timing,), the UE may follow the following procedures A-1 and A-2.

[Procedure A-1]

If there is any other DL signal having the indicated TCI state in the same symbol as A-CSI-RS, the UE may follow the following procedures A-1-1 and A-1-2.

[Procedure A-1-1]

The UE applies a QCL type D of the TCI state (one or two TCI states) of the DL signal to the buffering of the symbols of the A-CSI-RS.

[Procedure A-1-2]

After the buffering and completion of DCI decoding, the UE can measure CSI on the A-CSI-RS as in the following procedures A-1-2-1 and 2-1-2-2.

[[[Procedure A-1-2-1]]]

If the DL signal (other DL signal) refers to a PDSCH scheduled using two TCI states, the UE uses, for the CSI measurement, the A-CSI-RS buffered using the QCL type D in the first TCI state of the DL signal.

[[[Procedure A-1-2-2]]]

If the DL signal (other DL signal) is indicated one TCI state, the UE uses the buffered A-CSI-RS for the CSI measurement.

[Procedure A-2]

If there is no other DL signal having the indicated TCI state in the same symbol as the A-CSI-RS, the UE may follow the following procedure A-2-1.

[Procedure A-2-1]

The UE applies the QCL type D of the default TCI state (one or two TCI states) of the PDSCH to the buffering of the symbols of the A-CSI-RS. The default TCI state of the PDSCH is two TCI states corresponding to a lowest code point among TCI code points including two different TCI states.

For example, the UE receives a CSI-RS1 by using a TCI state 1, and receives a CSI-RS1 by using a TCI state 2. The UE buffers the two reception signals (stores the two reception signals in the memory).

[Procedure A-2-2]

After the buffering and the completion of the DCI decoding, the UE can measure a CSI on the A-CSI-RS as in one of the following options 1 and 2.

[[[Option 1]]]

The UE uses, for the CSI measurement, the A-CSI-RS buffered using the QCL type D in the first TCI state. The UE may not buffer the A-CSI-RS using the QCL type D in the second TCI state.

[[[Option 2]]]

If the indicated TCI state of the A-CSI-RS is the same as one of the two default TCI states, the UE uses, for the CSI measurement, the A-CSI-RS buffered by using the QCL type D in the same TCI state as the indicated TCI state. If the indicated TCI state of the A-CSI-RS is not the same as both of the two default TCI states, the UE uses, for the CSI measurement, the A-CSI-RS buffered using the QCL type D in the first default TCI state.

According to the option 1, since the UE always uses the first TCI state, a UE operation is simple. According to the option 2, the UE operation is complicated but the UE may select one of two buffered reception signals.

However, in the multi-TRP system based on the single DCI, when the scheduling offset of the A-CSI-RS is smaller than the threshold, it is unclear which of the two default TCI states the UE uses for measurement of the A-CSI-RS.

Therefore, the present inventors have conceived a method of determining default TCI used for A-CSI-RS measurement.

In the present disclosure, "A/B" and "at least one of A or B" may be interchangeable.

In the present disclosure, a panel, an uplink (UL) transmission entity, a TRP, spatial relation, a control resource set (CORESET), a PDSCH, a codeword, a base station, an antenna port (for example, a demodulation reference signal (DMRS) port) of a signal, an antenna port group (for example, a DMRS port group) of a signal, a group for multiplexing (for example, a code division multiplexing (CDM) group, a reference signal group, and a CORESET group), a CORESET pool, a CW, a redundancy version (RV), and a layer (MIMO layer, transmission layer, and spatial layer) may be replaced with each other. Further, the panel identifier (ID) and the panel may be replaced with each other. In the present disclosure, the TRP ID and the TRP may be replaced with each other.

In the present disclosure, the index, the ID, the indicator, the resource ID, and the like may be replaced with each other.

In the present disclosure, the cell, the CC, the carrier, the BWP, the active DL BWP, the active UL BWP, and the band may be replaced with each other. In the present disclosure, an RRC parameter, a higher layer parameter, an RRC information element (IE), and an RRC message may be read as interchangeable with each other.

In the present disclosure, the beam, the TCI state, the QCL assumption, the QCL parameter, the spatial domain reception filter, the UE spatial domain reception filter, the UE reception beam, the DL reception beam, the DL precoding, the DL precoder, the DL-RS, the QCL type D of the TCI state, the RS of the QCL type D of the TCI state, the RS of the QCL type D of the TCI state or the QCL assumption, and the RS of the QCL type A of the TCI state or the QCL assumption may be replaced with one another. In the present disclosure, the QCL type X-RS, the DL-RS associated with QCL type X, the DL-RS with QCL type X, a source of the DL-RS, the SSB, and the CSI-RS may be replaced with each other.

In the present disclosure, the UE in which the plurality of TRPs are configured may determine at least one of the TRP corresponding to the DCI, the TRP corresponding to the PDSCH or the UL transmission (PUCCH, PUSCH, SRS, or the like) scheduled by the DCI, or the like, on the basis of at least one of the following.

A value of a given field (for example, a field for specifying the TRP, an antenna port field, and PRI) included in the DCI.

DMRS (for example, a sequence of the DMRS, a resource, a CDM group, a DMRS port, a DMRS port group, an antenna port group, or the like) corresponding to the scheduled PDSCH/PUSCH.

DMRS (for example, a sequence of the DMRS, a resource, a CDM group, a DMRS port, a DMRS port group, or the like) corresponding to the PDCCH on which the DCI is sent.

CORESET (for example, a CORESET pool ID of the CORESET, an ID of the CORESET, a scramble ID (which may be replaced with a sequence ID), a resource, and the like) receiving DCI RS (such as RS-related group) used for the TCI state, the QCL assumption, the spatial relation information, and the like.

In the present disclosure, a single PDCCH (DCI) may be referred to as a PDCCH (DCI) of a first scheduling type (for example, scheduling type A (or type 1)). Further, multi-PDCCHs (DCI) may be referred to as a PDCCH (DCI) of a second scheduling type (for example, scheduling type B (or type 2)).

In the present disclosure, the single PDCCH may be assumed to be supported when multi-TRPs use ideal backhaul. The multi-PDCCHs may be assumed to be supported when the multi-TRPs use non-ideal backhaul.

Note that the ideal backhaul may be referred to as a DMRS port group type 1, a reference signal related group type 1, an antenna port group type 1, a CORESET pool type 1, and the like. Note that the non-ideal backhaul may be referred to as a DMRS port group type 2, a reference signal related group type 2, an antenna port group type 2, a CORESET pool type 2, and the like. The name is not limited thereto.

In the present disclosure, the multi-TRP, the multi-TRP system, the multi-TRP transmission, and the multi-PDSCH may be replaced with one another. In the present disclosure, the single DCI, the single PDCCH, the multi-TRP system based on the single DCI, and the activating the two TCI states on at least one TCI code point may be replaced with one another.

In the present disclosure, activation, updating, instruction, and configuration may be replaced with each other.

In the present disclosure, the scheduling offset of the A-CSI-RS, the scheduling offset between the last symbol of the PDCCH carrying the triggering DCI and the first symbol of the A-CSI-RS, the scheduling offset between the last symbol of the PDCCH carrying the triggering DCI and the first symbol of the A-CSI-RS in the non-zero power CSI-RS (NZP-CSI-RS) resource set (NZP-CSI-RS Resource Set) set without involving the TRS information (higher layer parameter trs-Info) may be replaced with one another.

In the present disclosure, the threshold, the beam switching timing threshold (beam Switch Timing), and the beam switching timing threshold reported by the UE may be replaced with one another.

In the present disclosure, the other DL signal, the other known DL signal, and the other DL signal satisfying the known condition for the TCI state may be replaced with one another.

(Radio Communication Method)

In the multi-TRP system (the multi-TRP transmission) based on the single DCI, if the scheduling offset of the A-CSI-RS is smaller than the beam switch timing threshold (beam Switch Timing), the UE may follow the procedures A-1 and A-2 explained above.

First Embodiment

The UE may report a specific UE capability (capability, UE capability information, and capability information) indicating that the option 2 is supported.

The UE may follow at least one of the following procedures 1-1 and 1-2.

[Procedure 1-1]

When the UE reports the specific UE capability, after the buffering and the completion of the DCI decoding in the procedure A-2-1, the UE may measure CSI on the A-CSI-RS as in the option 2. When the UE reports the specific UE capability, the two reception signals may be buffered using two default TCI states, one of the two default TCI states may be determined, and the buffered reception signals may be used for measurement of the A-CSI-RS using the determined TCI state.

[Procedure 1-2]

If the UE does not report the specific UE capability, the UE may follow one of the following procedures 1-2 a to 1-2 c.

[[Procedure 1-2-a]]

After the buffering and the completion of the DCI decoding in the procedure A-2-1, the UE may measure CSI on the A-CSI-RS as in the option 1. The UE may use, for CSI measurement, the A-CSI-RS buffered using QCL type D of the first TCI state of the two default TCI states for PDSCH. The UE may use, for the CSI measurement, the A-CSI-RS buffered using QCL type D of the second TCI state of the two default TCI states for PDSCH.

[[Procedure 1-2-b]]

If a condition of the multi-TRP system based on the single DCI is satisfied, the UE does not assume that an A-CSI-RS having a scheduling offset smaller than a threshold (for example, a beam switch timing threshold, beam Switch Timing) is received. A condition of the multi-TRP system based on the single DCI may be that the UE is activated in two TCI states on at least one TCI code point.

[[Procedure 1-2-c]]

If the condition of the multi-TRP system based on the single DCI is satisfied and there are no other DL signal on the same symbol as the A-CSI-RS, the UE does not assume that the A-CSI-RS having a scheduling offset smaller than the threshold (for example, the beam switch timing threshold, beam Switch Timing) is received.

FIG. 1 illustrates an example of a UE operation based on a specific UE capability. When the UE has reported the specific UE capability (S110: Y), the UE follows the option 2 (S120). When the UE has not reported the specific UE capability (S110: N), the UE follows any one of procedures 1-2a to 1-2c (S130).

According to the first embodiment explained above, the UE can appropriately determine the TCI state according to the UE capability.

Second Embodiment

In the procedure A-2-1, the UE applies the QCL type D in the default TCI state (two default TCI states) of the PDSCH to buffering of a symbol of the A-CSI-RS. The default TCI state of the PDSCH is two TCI states corresponding to a lowest code point among TCI code points including two different TCI states.

For example, the UE receives a CSI-RS1 by using a TCI state 1, and receives a CSI-RS1 by using a TCI state 2. The UE buffers the two reception signals (stores the two reception signals in the memory).

The UE may follow the following procedure 2-1 or 2-2.

[Procedure 2-1]

The UE selects one of the two buffered reception signals (in the TCI state) based on a specific field (a DCI field) in a triggering DCI of the A-CSI-RS and uses the selected reception signal for measurement of the A-CSI-RS.

The DCI that triggers the A-CSI-RS may include a TCI field. In this case, the specific field may be a TCI field.

The specific field may be a field other than the TCI field. For example, the specific field may be a field for triggering A-CSI-RS and the A-CSI report (for example, a CSI request field) or may be a field for triggering ZP-CSI-RS (for example, a ZP CSI-RS Trigger field).

The UE may determine one of the two reception signals based on a value of a specific bit in the specific field. A value 0 of the specific bit may correspond to the first TCI state and a value 1 of the specific bit may correspond to the second TCI state. A value 1 of the specific bit may correspond to the first TCI state and the value 0 of the specific bit may correspond to the second TCI state.

The specific bit may be any one of the following bits a to c.

[[Bit a]] A first bit of the specific field.

[[Bit b]] A second bit of the specific field.

[[Bit c]] A last bit of the specific field. For example, when the size of the specific field is 3 bits, the specific bit is the third 3 bits of the specific field.

[Procedure 2-2]

The UE selects one of the two reception signals based on a value of an implicit instruction and uses the selected reception signal for measurement of the A-CSI-RS. A value 0 of the implicit instruction may correspond to the first TCI state and a value 1 of the implicit instruction may correspond to the second TCI state. A value 1 of the implicit instruction may correspond to the first TCI state and the value 0 of the implicit instruction may correspond to the second TCI state.

The value of the implicit instruction may be any one of the following implicit instruction values a to c. The UE may select one of the two buffered reception signals (TCI states) based on the PDCCH carrying the triggering DCI of the A-CSI-RS and use the selected reception signal for A-CSI-RS measurement. The UE may select one of the two buffered reception signals (in the TCI states) based on resources of the A-CSI-RS and use the selected reception signal for the A-CSI-RS measurement.

[[Implicit Instruction Value a]]

A value based on the CCE index of the PDCCH carrying the triggering DCI of the A-CSI-RS. The CCE index may be a starting CCE index. The implicit instruction value may be a value based on the CCE index and an aggregation level of the PDCCH carrying the triggering DCI of the A-CSI-RS. The implicit instruction value may be an operation result of mod 2 for a value obtained by dividing the CCE index by the aggregation level. For example, when the value obtained by dividing the CCE index by the aggregation level is an even number, the implicit instruction value may be 0 and, when the value obtained by dividing the CCE index by the aggregation level is an odd number, the implicit instruction value may be 1.

[[Implicit Instruction Value b]]

A value based on a frequency domain resource (for example, a frequency resource index) of the A-CSI-RS. The frequency resource index may be an index of a lowest or highest PRB/PRG in frequency domain resources of the A-CSI-RS. The implicit instruction value may be an operation result of mod 2 on the frequency resource index. For example, when the frequency resource index is an even number, the implicit instruction value may be 0 and, when the frequency resource index is an odd number, the implicit instruction value may be 1.

[[Implicit Instruction Value c]]

A value based on a time domain resource (for example, a time resource index) of the A-CSI-RS. The time resource index may be an index of a minimum or a maximum symbol/subslot/slot/subframe/frame of a time domain resource of the A-CSI-RS. The implicit instruction value may be an operation result of mod 2 for the time resource index. For example, when the time resource index is an even number, the implicit instruction value is 0 and, when the time resource index is an odd number, the implicit instruction value may be 1.

Figure 2:
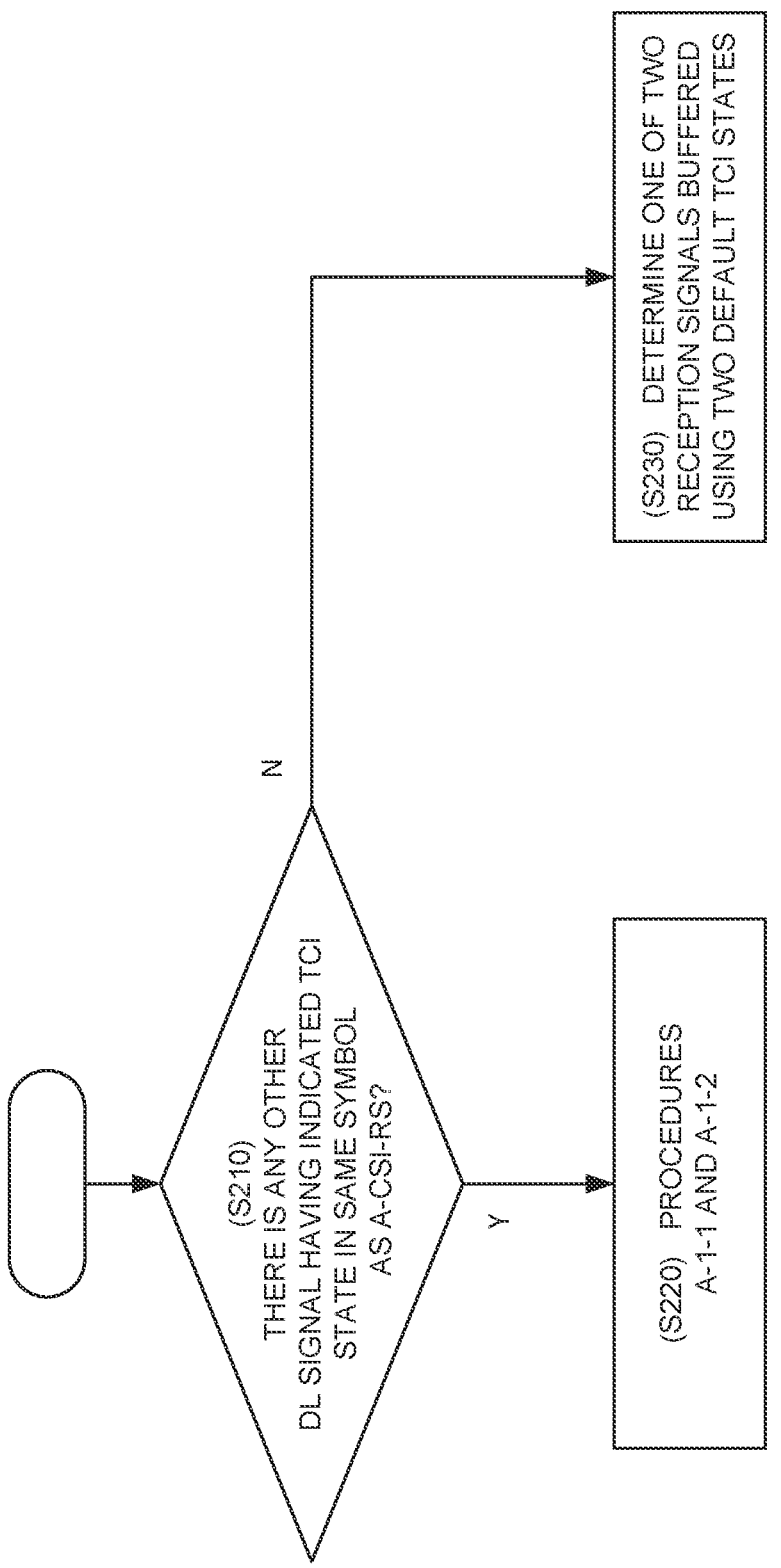
FIG. 2 is a diagram illustrating an example of a UE operation according to a second embodiment.

FIG. 2 illustrates an example of a UE operation in the case in which the scheduling offset of the A-CSI-RS is smaller than the beam switch timing threshold in the multi-TRP system based on the single DCI. If there is any other DL signal having the indicated TCI state in the same symbol as the A-CSI-RS (S210: Y), the UE follows procedures A-1-1 and A-1-2 (S220). If there is no other DL signal having the indicated TCI state in the same symbol as the A-CSI-RS (S210: N), the UE applies the QCL type D of the default TCI state of the PDSCH to buffering of the symbol of the A-CSI-RS, determines one of the two reception signals buffered according to the procedure B-1 or B-2, and uses the determined reception signals for measurement of the A-CSI-RS (S230).

In the first embodiment, the specific UE capability may indicate supporting the UE operation in the second embodiment (the procedure 2-1 or 2-2).

When the UE reports the specific UE capability, in the procedure A-2-2, after the buffering and the completion of the DCI decoding, the UE may measure CSI on the A-CSI-RS, as in the UE operation in the second embodiment.

According to the second embodiment explained above, one of the two default TCI states for PDSCH can be appropriately determined and the A-CSI-RS received using the determined TCI state can be used for measurement.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 3:
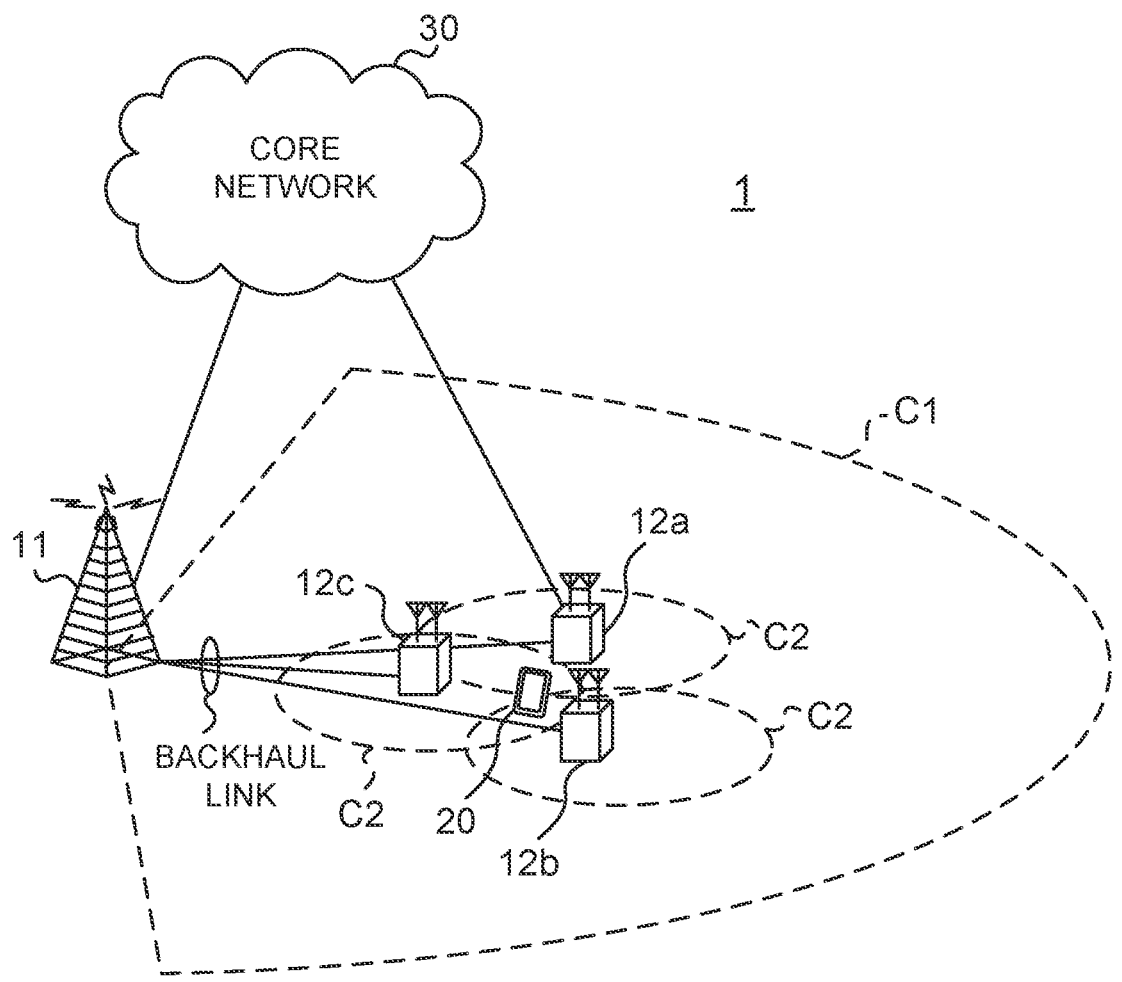
FIG. 3 is a diagram illustrating an example of a schematic configuration of a radio communication system according to an embodiment.

FIG. 3 is a diagram illustrating an example of a schematic configuration of the radio communication system according to an embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication in each CC using at least one of time division duplex (TDD) and frequency division duplex (FDD).

The plurality of base stations 10 may be connected to each other in a wired manner (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), a next generation core (NGC), and the like.

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

Further, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be read as interchangeable with DL data, and the PUSCH may be read as interchangeable with UL data.

For detection of the PDCCH, a control resource set (CORESET) and a search space may be used. The CORE-SET corresponds to a resource that searches for DCI. The search space corresponds to a search area and a search method for PDCCH candidates. One CORESET may be associated with one or more search spaces. UE may monitor CORESET associated with a certain search space based on search space configuration.

One search space may correspond to a PDCCH candidate corresponding to one or more aggregation levels. One or more search spaces may be referred to as a search space set. Note that "search space", "search space set", "search space configuration", "search space set configuration", "CORE-SET", "CORESET configuration", and the like in the present disclosure may be read as interchangeable with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), and the like may be transmitted by the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS).

Note that, DMRSs may be referred to as "user terminal-specific reference signals (UE-specific Reference Signals)."

(Base Station)

Figure 4:
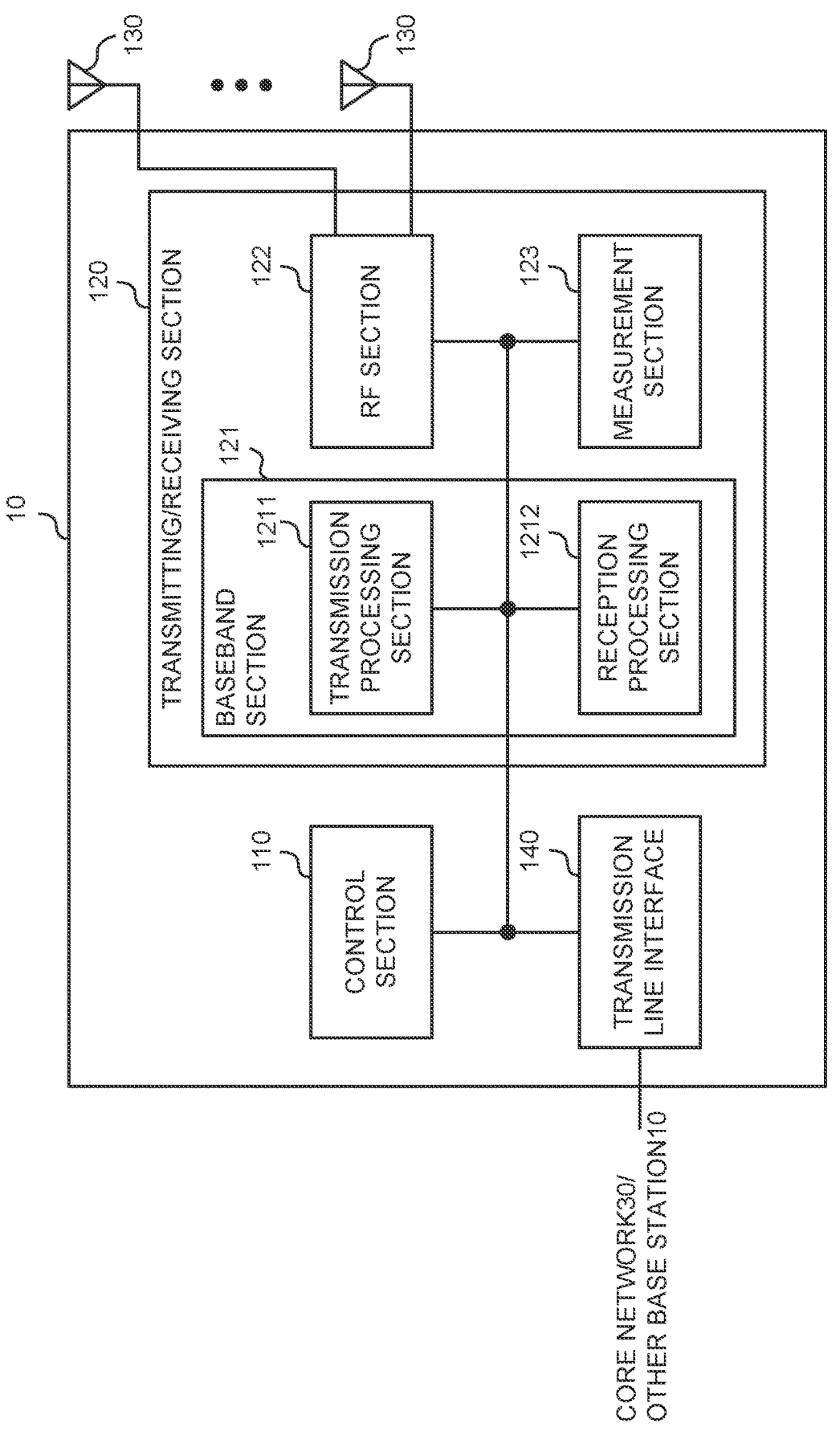
FIG. 4 is a diagram illustrating an example of a configuration of a base station according to the embodiment.

FIG. 4 is a diagram illustrating an example of a configuration of the base station according to the embodiment The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmission section/reception section, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be constituted as an integrated transmitting/receiving section, or may be constituted by a transmission section and a reception section. The transmission section may include the transmission processing section 1211 and the RF section 122. The reception section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that the transmission section and the reception section of the base station 10 in the present disclosure may include at least one of the transmitting/receiving section 120, the transmission/reception antenna 130, and the transmission line interface 140.

When there is no downlink signal having the indicated TCI state in the same symbol as the aperiodic channel state information reference signal (A-CSI-RS), the transmitting/receiving section 120 may transmit the A-CSI-RS using at least one of the two default transmission configuration indication (TCI) states for the physical downlink shared channel. One default TCI state of the two default TCI states is determined based on at least one of capability information and a physical downlink control channel for triggering of the A-CSI-RS and the control section 110 may obtain a report of the A-CSI-RS measured using the one default TCI state.

(User Terminal)

Figure 5:
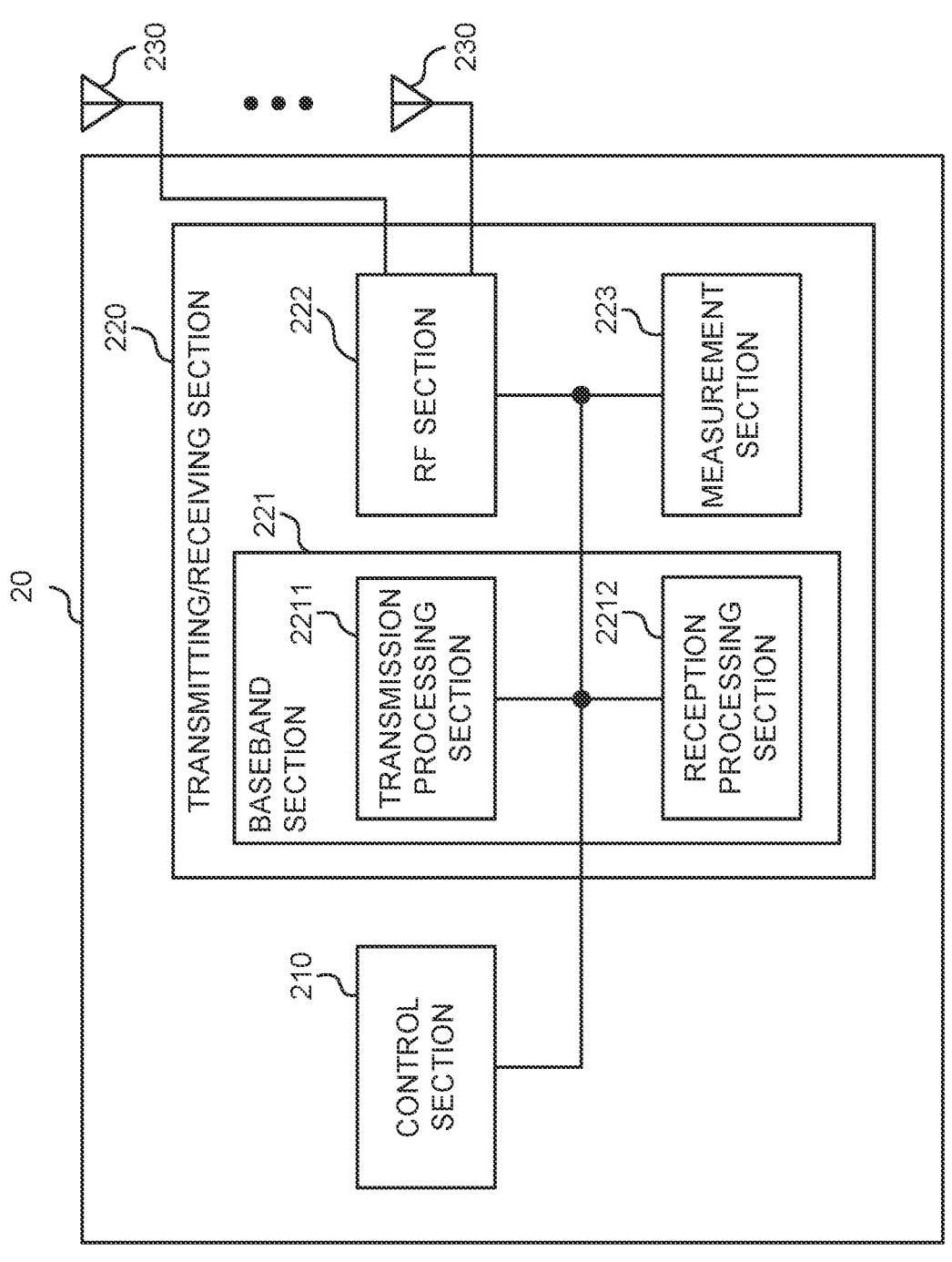
FIG. 5 is a diagram illustrating an example of a configuration of a user terminal according to the embodiment.

FIG. 5 is a diagram illustrating an example of a configuration of the user terminal according to the embodiment. The user terminal 20 includes a control section 210, a transmitting/receiving section 220, and a transmission/reception antenna 230. Note that, one or more each of the control sections 210, the transmitting/receiving sections 220, and the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data, control information, a sequence, and the like to be transmitted as signals, and may transfer the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmission section/reception section, an RF circuit, a baseband circuit, a filter, a phase shifter, a measurement circuit, a transmission/reception circuit, and the like that are described on the basis of common recognition in the technical field related to the present disclosure.

The transmitting/receiving section 220 may be formed as an integrated transmitting/receiving section, or may include a transmission section and a reception section. The transmission section may include the transmission processing section 2211 and the RF section 222. The reception section may include the reception processing section 2212, the RF section 222, and the measurement section 223.

The transmission/reception antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be determined on the basis of configuration of transform precoding. When the transform precoding is enabled for a channel (for example, PUSCH), the transmitting/receiving section 220 (transmission processing section 2211) may perform DFT processing as the transmission processing to transmit the channel by using a DFT-s-OFDM waveform, and when not, DFT processing does not have to be performed as the transmission processing.

The transmitting/receiving section 220 (RF section 222) may perform modulation to a radio frequency range, filtering processing, amplification, and the like on the baseband signal, to transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the reception section of the user terminal 20 in the present disclosure may include at least one of the transmitting/receiving section 220, the transmission/reception antenna 230, or the transmission line interface 240.

When there is no downlink signal having the indicated TCI state in the same symbol as the aperiodic channel state information reference signal (A-CSI-RS), the transmitting/receiving section 220 may receive the A-CSI-RS using two default transmission configuration indication (TCI) states for the physical downlink shared channel. The control section 210 may use, based on at least one of capability information and a physical downlink control channel for triggering of the A-CSI-RS, one default TCI state of the two default TCI states for measurement of the A-CSI-RS.

When the capability information is reported, the control section 210 may determine the one default TCI state from the two default TCI states and use, for measurement, the A-CSI-RS buffered using the one default TCI state (the first Embodiment, the procedure 1-1).

When the capability information is not reported, the control section 210 may use, for the measurement, the A-CSI-RS buffered using a first default TCI state of the two default TCI states or the scheduling offset of the A-CSI-RS may be equal to or larger than a threshold (the first embodiment, the procedure 1-2).

The control section 210 may determine the default TCI state based on at least one of the physical downlink control channel and the A-CSI-RS resource (the second embodiment).

(Hardware Configuration)

Note that the block diagrams that have been used to describe the above embodiments illustrate blocks in functional units. These functional blocks (components) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be implemented by combining the one apparatus or the plurality of apparatuses with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like. For example, a functional block (component) that has a transmission function may be referred to as a transmission section (transmitting unit), a transmitter, and the like. In any case, as described above, the implementation method is not particularly limited.

Figure 6:
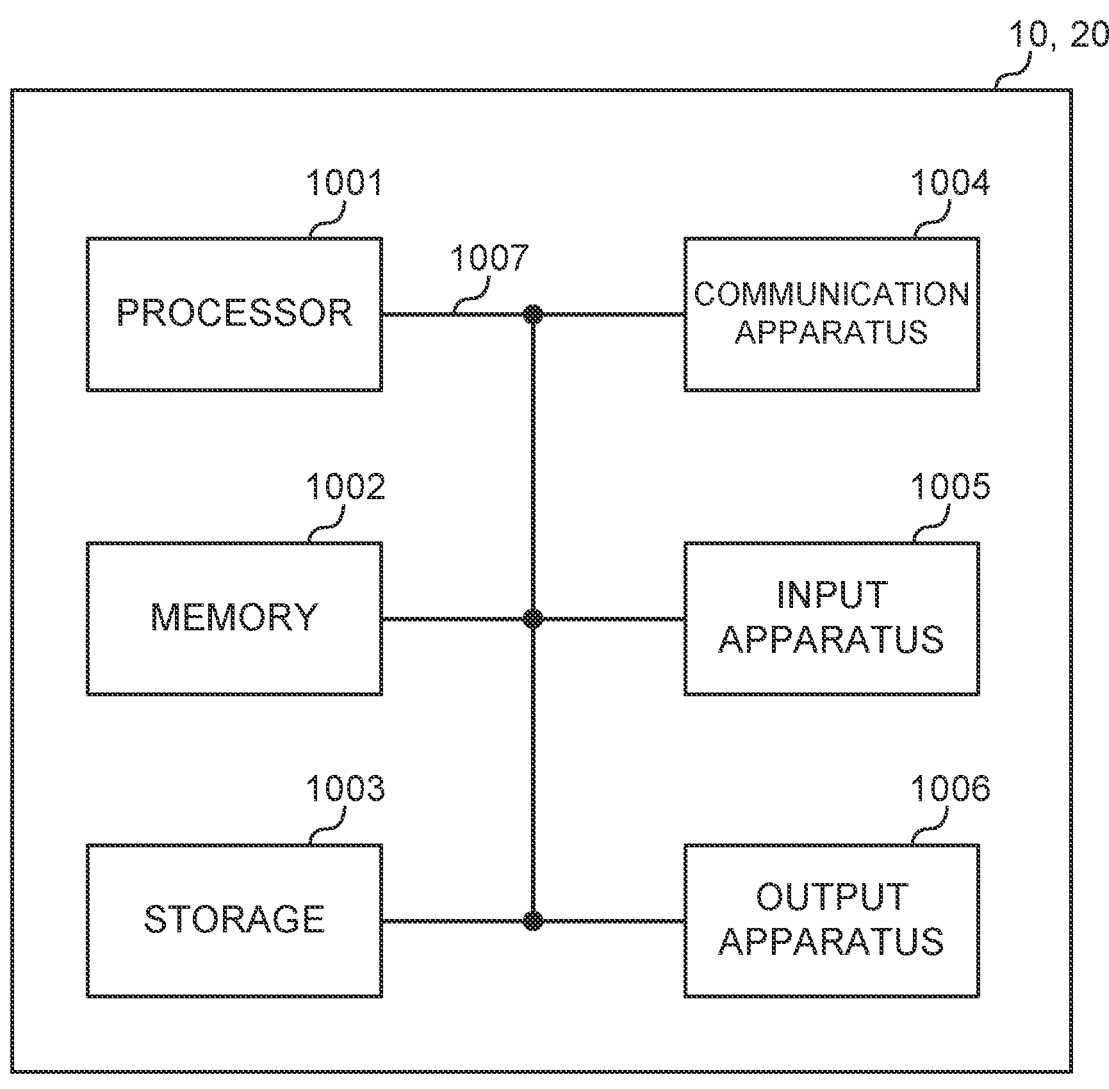
FIG. 6 is a diagram illustrating an example of a hardware configuration of a base station and a user terminal according to the embodiment.

For example, the base station, the user terminal, and the like according to one embodiment of the present disclosure may function as a computer that executes the processing of the radio communication method of the present disclosure. FIG. 6 is a diagram illustrating an example of a hardware configuration of the base station and the user terminal according to an embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be read as interchangeable with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by, for example, reading given software (program) onto hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and the like from at least one of the storage 1003 and the communication apparatus 1004 into the memory 1002, and executes various processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmission/reception device) for performing inter-computer communication via at least one of a wired network and a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmission section 120a (220a) and the reception section 120b (220b) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be read as interchangeable with each other. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transmitting/receiving section in the frequency domain, specific windowing processing performed by a transmitting/receiving section in the time domain, and the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

A radio frame, a subframe, a slot, a minislot and a symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be read as interchangeable with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit such as a channel-coded data packet (transport block), a code block, a codeword, or the like, or may be a processing unit such as scheduling or link adaptation. Note that when TTI is given, a time interval (for example, the number of symbols) in which the transport blocks, the code blocks, the codewords, and the like are actually mapped may be shorter than TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one minislot, one subframe or one TTI in length. One TTI, one subframe, and the like may each include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. A PRB may be defined in a certain BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE need not expect to transmit or receive a given signal/channel outside the active BWP. Note that, a "cell", a "carrier", and the like in the present disclosure may be read as interchangeable with a BWP.

Note that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, a radio resource may be specified by a given index.

Names used for, for example, parameters in the present disclosure are in no respect limitative. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. When the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other suitable terms.

At least one of the base station and mobile station may be called as a transmission apparatus, a reception apparatus, a radio communication apparatus, and the like. Note that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station and the mobile station also includes an apparatus that does not necessarily move during a communication operation. For example, at least one of the base station or the mobile station may be an Internet of Things (IoT) device such as a sensor.

Further, the base station in the present disclosure may be read as interchangeable with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be read as interchangeable with terms corresponding to communication between terminals (for example, "side"). For example, an uplink channel and a downlink channel may be read as interchangeable with a side channel.

Likewise, the user terminal in the present disclosure may be read as interchangeable with the base station. In this case, the base station 10 may be configured to have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, although various methods have been illustrated in the present disclosure with various components of steps using exemplary orders, the specific orders that are illustrated herein are by no means limiting.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on."

Reference to elements with designations such as "first", "second", and the like as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may encompass a wide variety of operations. For example, "determining" may be regarded as judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, "judge" and "determine" as used herein may be read as interchangeable with "assuming", "expecting", "considering", or the like.

The "maximum transmission power" described in the present disclosure may mean a maximum value of transmission power, nominal UE maximum transmit power, or rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be read as interchangeable with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency domain, the microwave region, and the optical (both visible and invisible) region, or the like.

In the present disclosure, the phrase "A and B are different" may mean "A and B are different from each other". Note that the phrase may mean that "A and B are different from C". The terms such as "separated", "coupled", and the like may be similarly interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

What is claimed is:

1. A terminal comprising:
   a receiver that receives an aperiodic channel state information reference signal (A-CSI-RS); and
   a processor that, when capability information indicating support of a behavior of using, for measurement of the A-CSI-RS, one default transmission configuration indication (TCI) state of two default TCI states configured with quasi-co-location (QCL) type D for a physical downlink shared channel (PDSCH) is reported and there is no downlink signal with indicated TCI state in a same symbol as the A-CSI-RS, controls to use, for measurement of the A-CSI-RS, the one default TCI state,
   wherein the one default TCI state is a first default TCI state of the two default TCI states, and
   the two default TCI states are two TCI states corresponding to a lowest codepoint of one or more TCI codepoints including two TCI states.

2. A radio communication method for a terminal, comprising:
   receiving an aperiodic channel state information reference signal (A-CSI-RS); and
   when capability information indicating support of a behavior of using, for measurement of the A-CSI-RS, one default transmission configuration indication (TCI) state of two default TCI states configured with quasi-co-location (QCL) type D for a physical downlink shared channel (PDSCH) is reported and there is no downlink signal with indicated TCI state in a same symbol as the A-CSI-RS, controlling to use, for measurement of the A-CSI-RS, the one default TCI state, wherein the one default TCI state is a first default TCI state of the two default TCI states, and the two default TCI states are two TCI states corresponding to a lowest codepoint of one or more TCI codepoints including two TCI states.

3. A base station comprising:

a transmitter that transmits an aperiodic channel state information reference signal (A-CSI-RS); and a processor that, when capability information indicating support of a behavior of using, for measurement of the A-CSI-RS, one default transmission configuration indication (TCI) state of two default TCI states configured with quasi-co-location (QCL) type D for a physical downlink shared channel (PDSCH) is received and there is no downlink signal with indicated TCI state in a same symbol as the A-CSI-RS, obtains a report of the A-CSI-RS measured using the one default TCI state, wherein the one default TCI state is a first default TCI state of the two default TCI states, and the two default TCI states are two TCI states corresponding to a lowest codepoint of one or more TCI codepoints including two TCI states.

4. A system comprising a terminal and a base station, wherein the terminal comprises:

a receiver that receives an aperiodic channel state information reference signal (A-CSI-RS); and a processor that, when capability information indicating support of a behavior of using, for measurement of the A-CSI-RS, one default transmission configuration indication (TCI) state of two default TCI states configured with quasi-co-location (QCL) type D for a physical downlink shared channel (PDSCH) is reported and there is no downlink signal with indicated TCI state in a same symbol as the A-CSI-RS, controls to use, for measurement of the A-CSI-RS, the one default TCI state, wherein the one default TCI state is a first default TCI state of the two default TCI states, and the two default TCI states are two TCI states corresponding to a lowest codepoint of one or more TCI codepoints including two TCI states, and the base station comprises:

a transmitter that transmits the A-CSI-RS.

* * * * *